Oct. 18, 1966 P. C. ZUMBUSCH 3,279,254
LIQUID LEVEL GAUGE
Filed Dec. 3, 1963 3 Sheets-Sheet 1
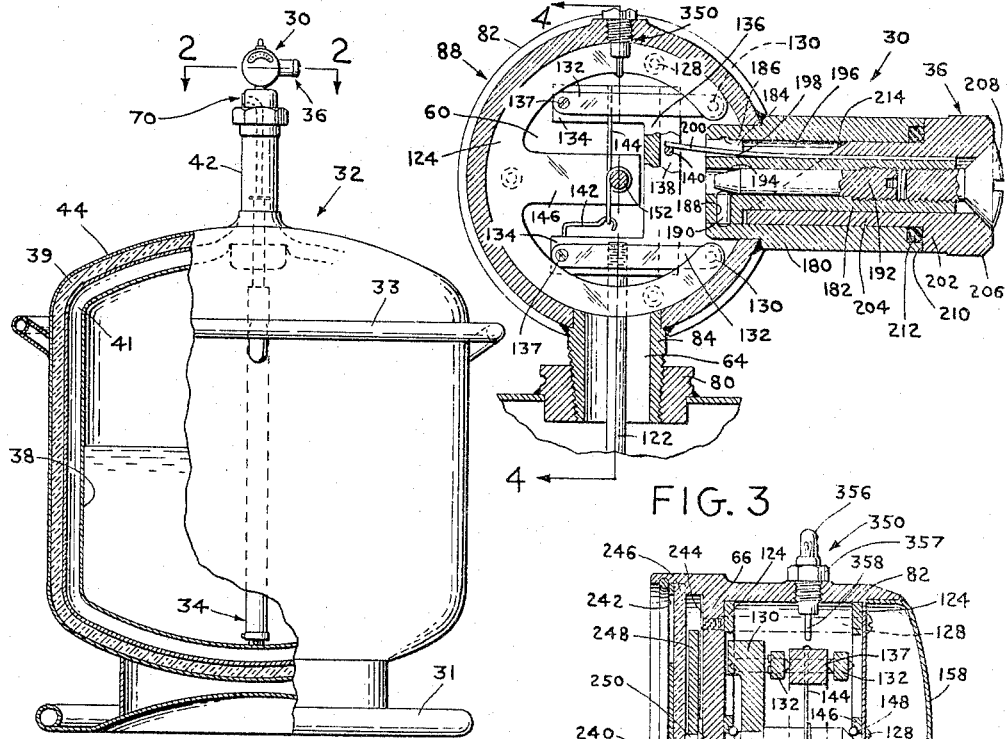
FIG. 3
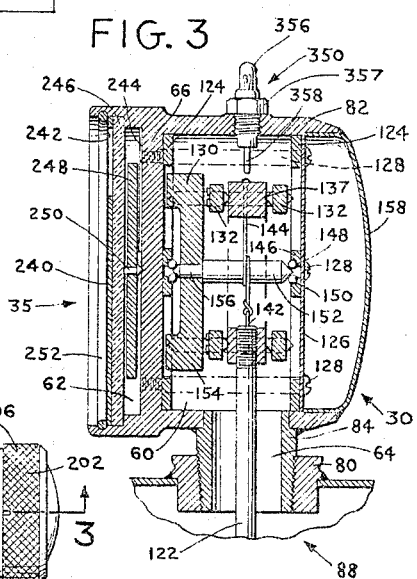
FIG. 4
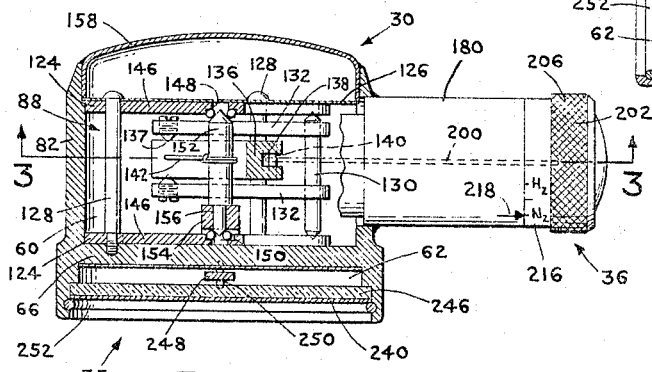
FIG. 1
FIG. 2
PETER C. ZUMBUSCH
INVENTOR.
BY Daniel H. Bobis
atty

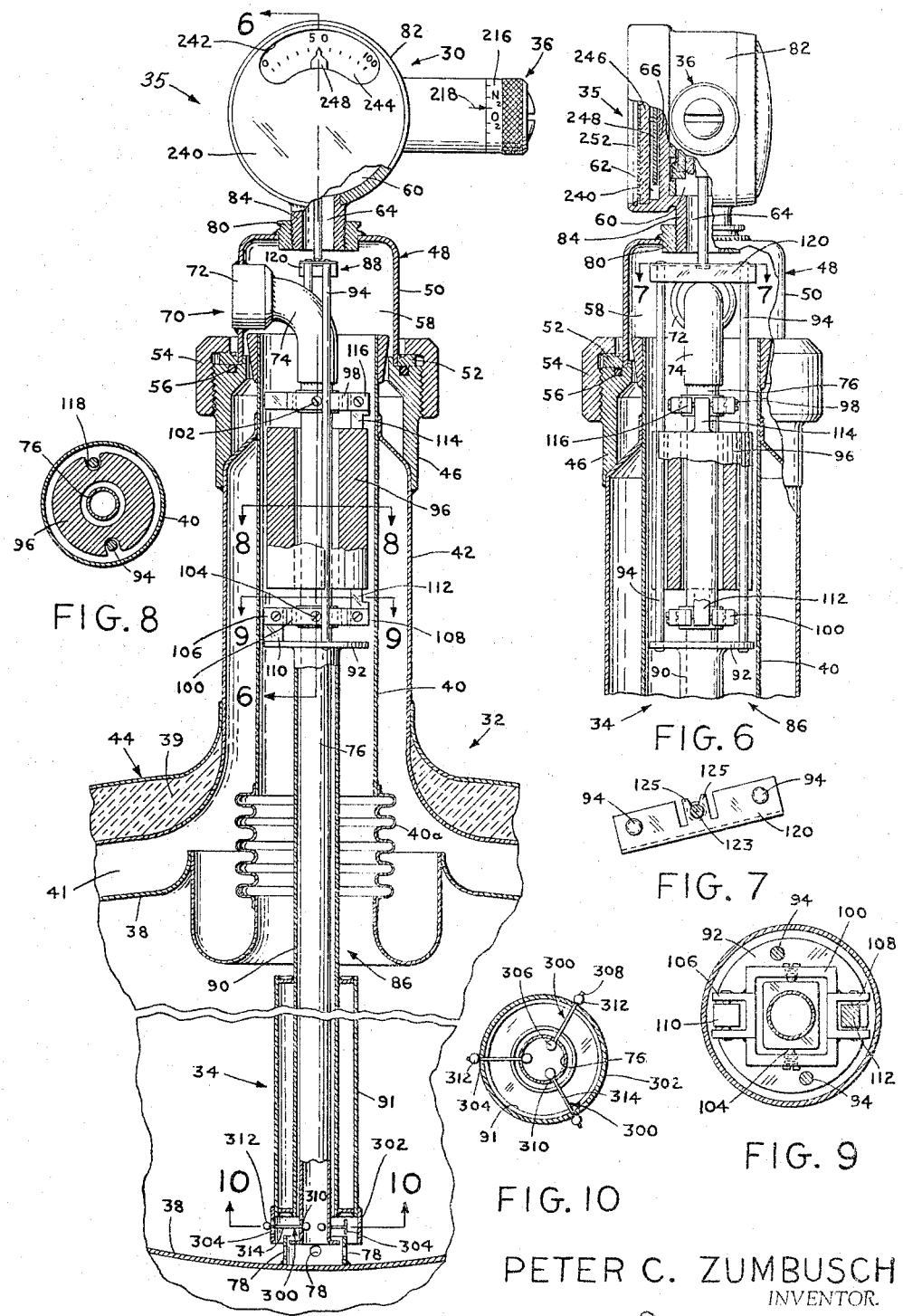

Oct. 18, 1966   P. C. ZUMBUSCH   3,279,254
LIQUID LEVEL GAUGE
Filed Dec. 3, 1963   3 Sheets-Sheet 3
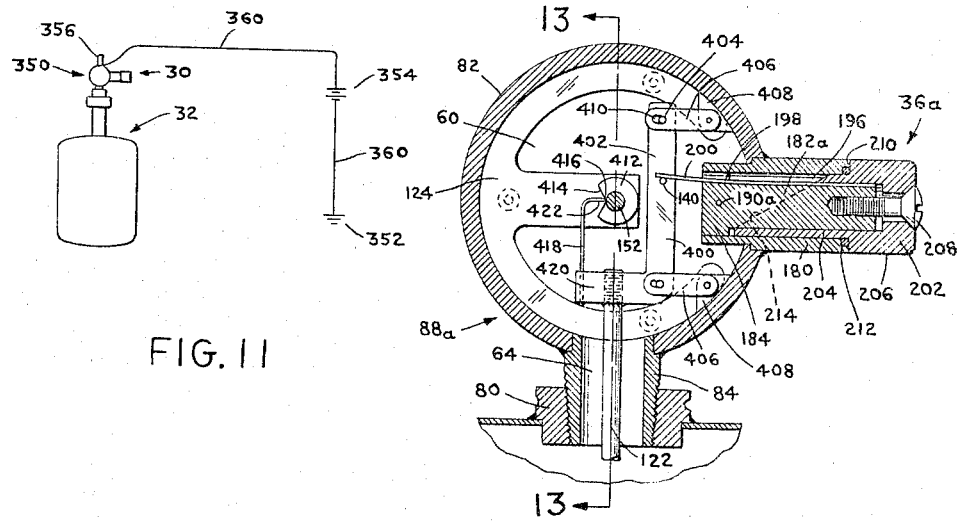
FIG. 11
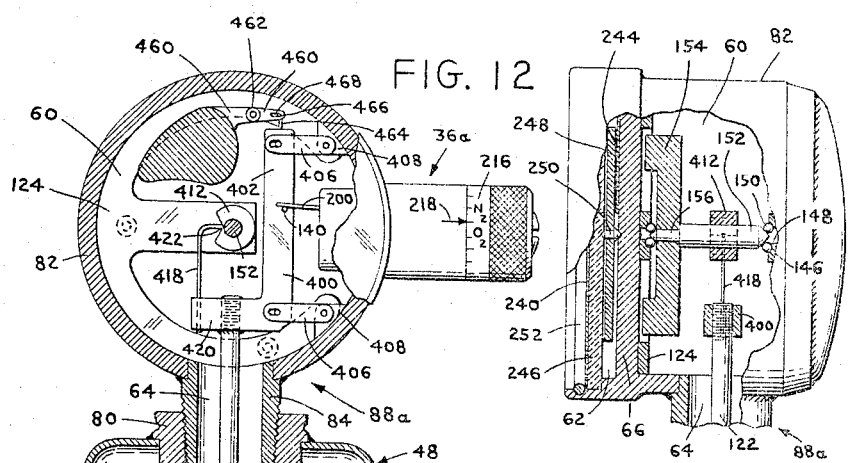
FIG. 12
FIG. 13
FIG. 15
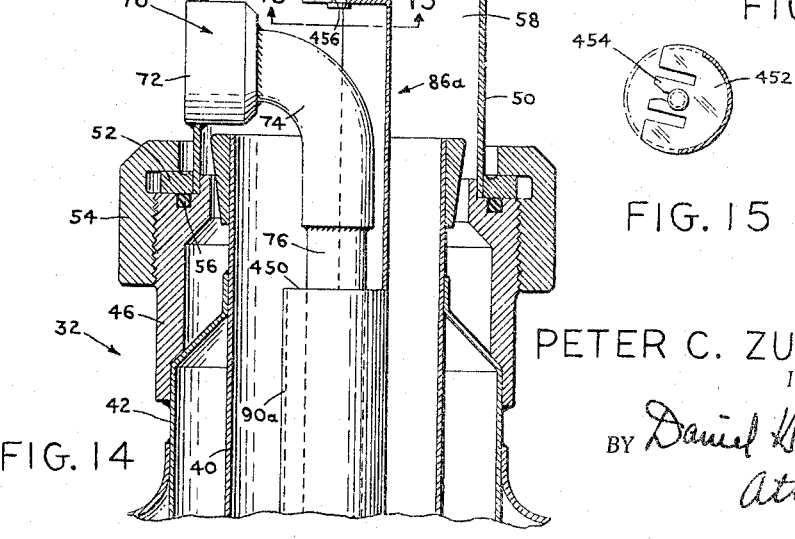
FIG. 14
PETER C. ZUMBUSCH
INVENTOR.
BY Daniel H. Bobis
Atty United States Patent Office 3,279,254
Patented Oct. 18, 1966

3,279,254
LIQUID LEVEL GAUGE
Peter C. Zumbusch, 110 Gordonhurst Ave.,
Upper Montclair, N.J.
Filed Dec. 3, 1963, Ser. No. 327,784
6 Claims. (Cl. 73—309)

The invention relates generally to measuring instruments and more particularly to a liquid level gauge for a closed vessel and is particularly adaptable for use with high pressure vessels of the cryogenic type.

However, this invention may be utilized for high or low pressure vessels of the cryogenic type or any other type vessel in which it is desired to measure the level of the fluid contained therein.

One of the problems in the prior art type of float and spring balance gauge arose from the fact that these gauges under normal conditions of transport, especially for cryogenic vessels, sustained repeated breakdowns and evidenced extreme malfunctions.

This was caused by the jostling, turbulence, oscillation and other abrupt changes and liquid level during such transport.

Another problem of the known type of liquid level gauge is that the liquids being measured vary over a wide range of specific gravities; hence a gauge accurate for one cryogenic fluid in the vessel would not be accurate for another and different fluid subsequently held by the same container.

A further problem which must be met, particularly on the handling of cryogenic fluids, is that the gauge must be so constructed that it will not provide a substantial surface on which ice can collect and affect the function of the measuring instrument.

The present invention overcomes these problems by providing a liquid level gauge wherein a weight balanced float assembly is provided to sense the variances in the level of the fluid being measured, and the force exerted by such variances is balanced by a resilient means in force balance operative association with the float means; the resilient means being further adapted for adjustment in accordance with the specific gravity of the fluid being measured, and the entire cooperative action through hermetic and magnetic action being transmitted to an external register means to provide direct reading for the liquid level measured.

Accordingly, it is an object of the present invention to provide an improved liquid level gauge; which may operate on a forced balance principle which is adapted for the measurement of cryogenic fluid; which is adjustable in accordance with the specific gravity of the particular fluid being measured; which permits the action of the measuring elements thereof to be hermetically sealed and to magnetically transmit the liquid level of the vessel to an externally disclosed register thereon.

Other objects and advantages will be apparent from the following description of several embodiment of the invention and the novel feature will be particularly pointed out hereinafter in the claims.

In the drawings:

FIGURE 1 is a front elevation of a vessel, partly in section, showing the improved liquid level gauge in operative association therewith.

FIGURE 2 is a view, partly in section, taken along line 2—2 of FIGURE 1.

FIGURE 3 is a sectional view taken along line 3—3 of FIGURE 4.

FIGURE 4 is a sectional view taken along line 4—4 of FIGURE 3.

FIGURE 5 is a vertical section through the vessel showing the improved liquid level gauge in operative association therewith.

FIGURE 6 is a sectional view taken along line 6—6 of FIGURE 5.

FIGURE 7 is a sectional view taken along line 7—7 of FIGURE 6.

FIGURE 8 is a sectional view taken along lines 8—8 of FIGURE 5.

FIGURE 9 is a sectional view taken along lines 9—9 of FIGURE 5.

FIGURE 10 is a sectional view taken along line 10—10 of FIGURE 5.

FIGURE 11 is a diagramatic representation of the electrical circuit for the warning light which may be used with the improved liquid level gauge.

FIGURE 12 is a sectional view of another form of the upper chamber and structure thereof of the improved liquid level gauge and specific gravity adjustment assemby thereof.

FIGURE 13 is a sectional view taken along line 13—13 of FIGURE 12.

FIGURE 14 is a sectional view of the vessel showing another form of the counterbalanced float means of the improved liquid level gauge.

FIGURE 15 is a sectional view taken along line 15—15 of FIGURE 14.

In the embodiment of the invention shown in FIGURES 1–11 the improved liquid level gauge 30 is shown in operative association with a vessel, which for illustrative purposes only is depicted as a high pressure cryogenic vessel 32, as the improved liquid level gauge is suitable for use with many other types of vessels such as low pressure cryogenic vessels, high and low pressure vessels for non-cryogenic service, etc.

Accordingly, FIGURES 1, 5 and 6 show improved liquid level gauge 30, including the float assembly 34, the specific gravity adjustment assembly 36 and the register assembly 35. The high pressure cryogenic vessel 32 is the common type which uses the usual insulated storage tank 38 having an elongated neck member 40 with a flexible metal section 40a therein and concentric with the neck portion 40 of the storage tank 38 is a corresponding neck portion 42 of the external insulating carrier 44. Between tank 38 and the outer wall of carrier 44 is disposed the typical layers of insulating material 39 and a vacuum space 41. Also to facilitate the handling vessel 32 a handle 33 is connected thereto. Further vessel 32 has a base 31 so that it may stand.

A threaded portion 46 welded to the uppermost external portion of the neck member 42 provides for means for attaching casing 48 of the liquid level gauge 30 thereto. Casing 48 is provided with a bell 50 having a flange 52 about the lower end thereof, which flange 52 is held in engagement with the upper face of the threaded portion 46 by means of the locking collar 54 which can be threaded into the threaded portion 46 so that the upper end of the collar 54 will engage and hold the flange 52 in tight abutment with the upper face of the threaded collar 54. O-ring 56 is provided to form a liquid tight seal between the flange 52 and the upper face of the threaded portion 46.

As shown in FIGURES 5 and 6 the casing 48 is divided into three chambers. These are designated as the lower chamber 58, the upper chamber 60, and the register or scale chamber 62. It will be noted that between the lower chamber 58 and upper chamber 60 there is an opening or free passage 64 which provide free communication between these chambers. Thus chamber 58 and chamber 60 are in direct communication with tank 38 through the neck member 40. However, between the upper chamber 60 and register or scale chamber 62 there is an impermeable partition 66 so that the register assembly 35 is separaed and sealed therefrom.

The casing 48 is constructed of a suitable material which will withstand the pressures associated with high-pressured cryogenic vessel 32.

The bell portion 50 of the casing 48 not only adapts the casing to the particular storage vessel for the liquid in question but it also provides, in the lower chamber 58, means for connecting a charging and discharging tube assembly 70 as by the connecting fitting 72 disposed in the side of the bell 50 and the elbow fitting 74 which connects to the charging and discharging tube 76. Tube 76 communicates with tank 38 through opening 78 at the bottom thereof. Since tube 76 is an elongated member, it will fit down through the neck member 40 into the liquid in the tank 38 of the vessel 32 and permit easy charging and discharging of the liquid in the vessel 32 through opening 78.

In addition tube 76 provides a supporting means for the float assembly 34 as is more fully described hereafter.

The upper portion of the casing 48 having the upper chamber 60 therein is essentially disposed on the bell means 50 by means of a centrally located thimble 80 so that the upper housing 82 will be in substantial alignment with the axial line of tube 76 and the passage 64 will also be similarly situated as this passage is formed in the threaded extension 84 which is connected to the thimble 80 at the upper portion of the bell 50.

The float assembly 34 includes the counterbalanced float means 86 and the rod and linkage means 88.

The liquid level gauge 30 of the present invention relies for its signals on the float means 86. FIGURES 1 and 5 show that the float means 86 consists of float tube 90 which has an elongated annular float 91 connected thereon and a counterweight 96; these components are disposed about and concentric to the charging tube 76.

The upper portion of the float tube 90 has an outwardly extending annular flange 92 formed thereon, well below elbow fitting 74 and connected thereto are a pair of rods 94 of the rod and linkage means 88 which straddles the charging tube assembly 70 so that the float assembly 34 will be free to move vertically relative thereto. Flange 92 also has a leg 110 formed thereon for purposes described hereinafter.

Charging and discharging tube 76, as illustrated in FIGURES 5, 6, and 9 provides means for mounting the counterweight 96 to balance the weight of the float tube 90 so that the float tube 90 is in equilibrium. This is accomplished by a pair of spaced collars 98 and 100 connected to the charging tube 76 and provides fulcrums as at 102 and 104. Yokes 106 and 108 of collar 100 are pivotally connected to legs 110 and 112 of the float tube 90 and counterweight 96 respectively. Leg 114 of counterweight 96 is pivotally connected to yoke 116 of collar 98 to maintain the position of the counterweight 96 by having the collars 98 and 100 remain in parallel relationship to each other and there is sufficient clearance to allow for the slight lateral movement of counterweight 96 and float tube 90 regardless of the level of the liquid in vessel 32 which for convenience is shown in FIGURE 1 as being half full.

The counterweight 96 will be so adjusted relative to the float tube 90 that these elements will be in accurate balance either under atmospheric conditions outside the pressure vessel 32 or when placed in the empty pressure vessel 32.

Since it is in equilibrium, the float tube 90 will operate strictly to sense the buoyance forces exerted by the level of the liquid contained in tank 38 and will move upwardly or downwardly as a function of this force; the amount and direction of movement of the float tube 90 will be determined by the level of the liquid being measured, which movement will be minimized by the use of the force balance specific gravity adjustment assembly 36 as described more fully hereinafter.

This force will be transmitted through rods 94 extending from flange 92 as shown in FIGURE 8 through recess 118 of counterweight 96 to connect with plate 120. Thus rod 94 serves as the connecting means between the counterbalance float means 86 and the rod and linkage means 88.

Connected to plate 120, as illustrated in FIGURES 5, 6 and 7, is rod 122 of rod and linkage means 88, which is dimensioned to permit it to extend through the opening 64 from the lower chamber 58 to the upper chamber 60. Rod 122 will transmit to the other components of the rod and linkage means 88 as described hereinafter all movement of the float tube 90 simultaneously which are taking place during the operation of the present invention. The rod 122 has a recess 123 therein which is engaged by flexible extension tips 125 of plate 120. Since the vertical height of recess 123 is substantially the same as the thickness of extension tips 125 there will be no lost motion and any movements will be directly and accurately transmitted.

The remaining components of rod and linkage means 88 are disposed in upper chamber 60 within housing 82 as illustrated in FIGURES 2, 3 and 4, in which a pair of C frames 124 mounted on impermeable partition 66 and rear wall 126, respectively as by threaded spacing screws 128. A pair of radial lever arm shafts 130 are rotatably disposed between C frames 124 and have fixedly connected thereto, inwardly of the C frames 124, pairs of parallel radial lever arms 132 which pairs extend outwardly from shaft 130 in parallel relationship to each other. Pivotally mounted between each pair of radial lever arms 132 at the end thereof remote from shaft 130, as at 137, the outer ends 134 of yoke 136. The vertical leg of yoke 136 has a slot 138 in which a pin 140 extends across, in the upper half thereof. Adjacent the lower end 134 of yoke 136 a resilient hook 142 is mounted, the open end of which has connected thereto a suitable string means 144 made of wire or cord or any other suitable material. The other end of string means 144 is fixedly connected to yoke 136 adjacent the upper end 134 thereof. C frames 124 have a central leg 146 extending from the mid-portion thereof at the side remote from shaft 130. Each leg 146 has a hole 148 therein adjacent the end thereof. Annular bearing means 150 are disposed on the inward side of opening 148 extending between openings 148 which are in alignment with each other and engaging the bearing means 150 is a shaft 152. Adjacent the impermeable partition 66 a bar magnet 154 is fixedly mounted on the smaller diameter section 156 of shaft 152. Further the string means 144 which extends from the resilient hook 142 to the upper end 134 of yoke 136 is looped about shaft 152 at a point approximately midway between the bar magnet 154 and the end remote therefrom. A cover 158 completes the assembly of upper housing 82.

Rod 122 is threadedly connected to the lower portion of yoke 126 and will transmit any movement of the float tube 90 thereto. Because the ends 134 of yoke 136 are pivotally connected to radial lever arms 132 which in turn are connected to the rotatable shaft 130, no binding will take place and yoke 136 is free to move either upwardly or downwardly corresponding to the movement of rod 122. Further there will be no binding of the components because the total movement is small. On movement of yoke 136 the loop of the string means 144 about shaft 152 will cause rotation of shaft 152 and the bar magnet 154 connected thereto for purposes more fully described hereinafter.

The specific gravity adjustment assembly 36, as shown in FIGURES 2 and 3, is fixedly connected to housing 82 by its outer sleeve 180 in any suitable manner such as welding or the like. The inner sleeve 182 has a portion along its greater length of substantially less diameter than that of the inner diameter of the outer sleeve 180, and an annular flange 184 is formed at one end thereof with a diameter substantially the same as the inner diameter of the outer sleeve 180 so as to provide a snug engagement between these elements. The outer sleeve 180 has an inner annular groove 186 formed adjacent flange 184. Flange 184 has a radial hole 188 extending therethrough into which a pin 190 is disposed. A locking screw 192 is threadedly engaged in the inner diameter of the inner sleeve 182. Locking screw 192 has a tapered end 194 at the end thereof remote from its turning means and when locking screw 192 is threadedly rotated in the direction of flange 184 its tapered end 194 will engage pin 190 and urge pin 190 into the annular groove 186, to cause the inner sleeve 182 and the outer sleeve 180 to be locked in position.

By reason of the differences in the diameter of outer sleeve 180 and inner sleeve 182, a space 196 is formed therebetween. A lengthwise groove 198 is cut in the inner sleeve 182 facing the space 196. A resilient element or cantilever spring 200 is disposed in groove 198 and fixedly connected therein at the end thereof remote from flange 184 as by any suitable means (not shown) such as soft solder or welding.

The rest of the length of resilient element 200 is free to move and the unconnected ends thereof will be cantilevered in upper chamber 60 and extend into slots 138 to be engaged by pin 140 which will generally urge it to a greater or lesser extent in a direction away from groove 198. The cantilevered resilient element 200 is an elongated round member, wire-like in construction, the shape of which may be changed as desired.

The resilient element 200 will have substantial resiliency as may be required to balance the forces being exerted by the float tube 90 during the operation of the present device.

This cantilevered arrangement of resilient element 200 will permit the desired force balance operation and limit the movement of float assembly 34 on which the present device depends. However, in order to insure accuracy of the operation of the present device, it is necessary to provide means for adjusting the resiliency of the cantilevered spring 200 in accordance with the change in specific gravity of the fluid being measured. This adjustment means comprises a selector sleeve 202 which includes a cylindrical or annular tubular-like portion 204 at one end and a knurled handle 206 continuous therewith at the other end.

The cylindrical portion 204 of the selector sleeve 202 has a wall thickness designed to permit it to rotatably fit between the outer wall of the inner sleeve 182 and the inner wall of the outer sleeve 180 such that it acts to hold the resilient element 200 in the groove 198.

Selector sleeve 202 is rotatably mounted between outer sleeve 180 and inner sleeve 182 and secured in position by threaded element 208 which engages the threaded inner section of inner sleeve 182. Knurled handle 206 is provided with a shoulder at 210 which receives therein an O-ring 212 to provide a fluid tight sealing arrangement and prevent the escape of the fluid being measured through the upper chamber 60.

The inner edge of cylindrical portion 204 of selector sleeve 202 is cut at an angle or biased as at 214. As the selector sleeve 202 is turned, it will move to expose more or less of the resilient element 200 in the groove 198 of the inner sleeve 182.

Hence, as the groove 198 is exposed more of the resilient element 200 will be free. This will increase the resiliency but decrease its ability to exert a force balance through the movement of the float tube 90. However, because of this adjustable resiliency feature, the float tube 90 will be able to work between any given range of specific gravity regardless of the fluid being measured.

The exterior portion of the selector sleeve 202 adjacent to and inwardly of the knurled handle 206 has on the outside thereof a vernier scale 216 which is marked in spaced relation for various types of liquid such as $O_2$—oxygen; $N_2$—nitrogen, etc. Conversely the outer sleeve 180 has on its exterior portion inwardly of the shoulder 210 an indicating line 218 whereby the knurled handle may be rotated to set the vernier scale 216 in alignment with the indicating line 218 for the particular liquid being transported or stored in tank 38 of vessel 32; the vernier scale 216 being so calibrated that this setting will correspond to the range setting uncovered by the angled or biased edge 214 of the cylindrical portion 204 of selector sleeve 202 as has been above described.

The register assembly 35 is disposed in the register or scale chamber 62 as shown in FIGURES 2, 4, and 5, which chamber is located on the front side of housing 82 of the casing 48 and exteriorly of the upper chamber 60. Register chamber 62 is closed by a cover element 240 which has a window opening 242 formed therein through which a register or scale 244 can be viewed through the glass or Lucite pane 246 disposed inwardly of cover element 240.

Scale 244 can be graded in any number of ways. In the manner illustrated in the drawings it is put in percentages of the volume of liquid which remains in tank 38, which volume is a direct function of the liquid level being measured.

A magnetized pointer 248 is mounted in the register chamber 62 on a shaft 250 which is disposed and supported between the partition wall 66 and the cover element 240 with the pointer 248 free to be rotatably actuated by magnetic member or bar magnet 154. The position of bar magnet 154 and pointer 248 which is attracted thereto is pre-set to correlate the level of the liquid in tank 38 with the indicated percentage readings on register 244. Hence, pointer 248 will be movable across the face of the register 244, between the limits of zero percent to 100 percent, in accordance with the changes in the level of the liquid in tank 38 of the vessel 32.

The pointer 248 is operated by the hermetically contained magnetic member 154 which is mounted on shaft 152 and will rotate therewith. Shaft 152 is pivotally disposed with its axis in substantial alignment with the axis of shaft 250 on which pointer 248 is mounted. Shaft 250 has one end thereof rotatably engaging the partition 66 and the other end thereof rotatably engaging to the pane 246. The register assembly 35 is operatively assembled by placing snap ring 252 in groove 254.

It will be noted that the hermetic actuating member 154 is disposed on shaft 152 in the upper chamber 60 and operates the pointer 248 by means of the magnetic lines of force which extend through the impermeable partition 66 between the upper chamber 60 and the register chamber 62.

To prevent excessive lateral shifting or rotation of float tube 90, to add stability, and to permit free upwardly or downwardly movement thereof, float tube 90, at the bottom thereof, is connected to charging tube 76 by suitable means such as retaining pins 300. FIGURES 5 and 10 show an annular skirt 302 connected at the outer end of the bottom of elongated float 91 and has a plurality of vertical slots 304 formed therein. Pins 300 have rounded heads 306 and threaded ends 308. Pins 300 will be passed through hole 310 in charging tube 76 with the threaded end thereof extending through slot 304 in skirt 302 and have spherical nuts 312 threadedly engaged thereon. The length of slots 304 is at least as great as the maximum expected movement of float tube 90. The width of slots 304 and the diameter of holes 310 are larger than the diameter of shaft 314 of pin 300 but smaller than the diameter of head 306 or nut 312. Thus float tube 90 will be free to move in a vertical direction where lateral movement or rotation thereof will be substantially restrained. To facilitate the movement of float tube 90 in the vertical direction, it is noted that head 306 and nut 312 are spherically spaced so as to offer a minimum contact when the float tube 90 moves relative to the pin 300.

As shown most clearly in FIGURES 4, 5 and 11 the improved liquid level gauge 30 may have a signal lamp assembly 350 associated therewith. Assembly 350 has a circuit which consists of ground 352, battery 354, lamp 356 and slidable rod 358 and the interconnecting wire 360. Lamp 356 is connected to housing 82 by a threaded member 357. As the level of the liquid in vessel 32 rises, it will cause a corresponding rise of float tube 90, which rise will be transmitted through rod 122 and yoke 136 as described hereinbefore. When the level of liquid in tank 38 is between 75 percent and 100 percent, yoke 136 will engage movable rod 358 to complete the circuit, as vessel 32 acts as the second ground, causing the light 356 to illuminate. Light 356 will remain lit so long as the liquid level is between the range of 75 percent and 100 percent, but of course this figure could be set at any desired range. In fact the assembly 350 could be used to operate to indicate a certain decreasing level of the liquid. This could be done by simply changing the location of assembly 350 in housing 82 or by adding an automatic switch (not shown) which would operate the circuit when yoke 136 (not shown) which would operate the circuit when yoke 136 moved in a downward direction a predetermined amount.

In the embodiment shown in FIGURES 12 and 13 another form of the rod and linkage means and specific gravity member is shown and generally referred to as 88a and 36a respectively. However where components are substantially the same as that which was previously described the reference character identifying such components will be the same as that previously used.

The specific gravity adjustment assembly 36a will operate substantially identical to that previously described and except for the use of inner sleeve 182a which is solid thus eliminating the need for locking screw 192 as the inner sleeve 182a and the outer sleeve 180 are joined directly by pin 190a, the structure and operation will be identical with the cantilevered spring 200 extending into upper chamber 60 to be engaged by pin 190 so that float assembly 34 operated by force balance will be identical. Thus a more detailed explanation need not be repeated again but reference may be had to the description given hereinbefore.

Rod and linkage means 88a uses the same C frames 124 upon which is mounted shaft 152 in annular bearings 150 disposed in holes 148 of leg 146. Bar magnet 154 is mounted on section 156 of shaft 152 and will be rotated therewith. Thus the results accomplished will be substantially the same, however another form of structure will transmit the motion of rod 122 to shaft 152. Accordingly rod 122 is threadedly connected to an L-shaped block means 400 which has a leg 402 laterally disposed but movable in a plane substantially parallel to the actual line of the movement of float tube 90. Pin 140 is fixedly connected to leg 402 in a transverse line of the movement thereof and engages spring 200 as described hereinbefore.

For support, leg 402 of block means 400 is pivotally connected at either end, as at 404, to parallel links 406. Links 406 in turn are pivotally connected to brackets 408 formed in housing 82. Links 406 have lost motion slot 410 at the pivot connection 404 with leg 402 thus preventing any binding from the upward or downward movement of block means 400.

The magnetic member 154 is rotated in accordance with the movement of L-shaped block member 400, and this is accomplished by providing actuating means 411 which include an annular driven disc member or cog 412 and a needle drive member 418. Cog 412 is mounted on shaft 152 on the side of magnetic member 154 remote from the partition means 66.

Cog 412 includes a pie-shaped opening or V cutout 414 in one side thereof and may be constructed with a nylon center which is disposed at the apex 416 of opening 414. Needle drive member 418 is fixedly mounted in horizontal leg 420 of block means 400 and the outer end thereof will engage opening 414 of cog 412.

Needle drive member 418 is L-shaped in construction and has an inverted form so that one of the legs thereof can be turned to project transversely through the axial line of rotation of shaft 152 and engage the pie-shaped opening 414 with its tapered end 422. Since the level of the liquid is depicted as being at the 50 percent mark, end 422 will be engaged with apex 416. However when the block means 400 moves in the upwardly or downwardly direction needle drive member 418 will move away from apex 416 along the sides of opening 414 thus causing cog 412 to rotate in one direction or the other depending on the particular condition of operation being signaled and the offset relation of the block member 400 causing this rotation.

The rotation of shaft 152 will be transmitted to the magnetic member 154 which is fixedly mounted on shaft 152 and on rotation of the magnetic member the pointer 248 which is made of material subject to magnetic lines of force will rotate and move simultaneously therewith to depict on scale 244 the exact level of the liquid in tank 38.

In the embodiment shown in FIGURES 14 and 15 the rod and linkage means 88a is used with another form of the float means designated generally as 86a. Once again previously described components will be given like reference characters and the necessary structural differences will be noted.

When the vessel 32 is relatively small or has a relatively short neck, float means 86a will permit the float assembly 34 to be mounted about the charging tube assembly 70 by the use of float tube 90a of float means 86a which extends into lower chamber 58 and connects directly to rod 122 of rod and linkage means 88a. The upper portion of float tube 90a is slotted as at 450 so that it will be free to fit about and move relative to the elbow fitting 74 and connecting member 72 of charging tube assembly 70. A plate 452 is formed at the upper end of float tube 90a in a substantially horizontal plane and has a retainer means 454 formed thereon to engage the recess 456 of rod 122 whereby the movement of float tube 90a will be directly transmitted to rod 122.

This construction allows the counterweight assembly to be located in the upper chamber 60. Accordingly the counterweight 96a is disposed in upper chamber 60 and connected to one end of linkage arm 460. Arm 460 is pivotally connected at its mid-section to housing 82 as at 462. The other end of arm 460 is pivotally connected to rod 464 as at 466 by a lost motion slot 468 as to prevent binding the movement of block member 400.

While the location of counterweight 96a has been changed, the operation and function thereof is substantially the same, mainly that of balancing the weight of the float tube 90a so that it will operate in a substantially weightless state to indicate the level of the liquid in tank 38 as a direct function of the liquid's buoyancy forces.

It will be noted that all points of components within the casing 48 where operation thereof requires contact for rotation to be produced that the bearing surfaces or contacting surfaces are in a substantially pointed or needle-like shape. The object of this construction is to eliminate or reduce to a minimum the possibility of freeze-up as such condition is prevalent in the handling of cryogenic fluids if steps are not taken to prevent this from occurring.

It will be understood that various changes in the details, materials and arrangement of parts which have been herein described and illustrated in order to explain the nature of the invention may be made by those skilled in the art within the principles and scope of the invention as expressed in their claims.

What is claimed is:
1. A liquid level gauge for indicating the level of a fluid in a vessel, comprising:
   (a) a float assembly having a counterweight associated therewith making the float assembly sense the level of the liquid directly as a function of the liquid's buoyancy;
   (b) a casing connected to the vessel having an opening in communication with the liquid therein;

(c) connecting means connected to and movable responsive to the movement of said float assembly and disposed to extend through the opening into said casing;
(d) resilient means adjustably connected to said casing and coacting with said connecting means to permit and adjust the force balance on the float assembly in accordance with the specific gravity of the fluid being measured by the liquid level gauge;
(e) magnetic means movably mounted in said casing and actuated responsive to movement of said connecting means,
(f) and register means hermetically disposed relative said casing and adapted to move responsive to the movement of the magnetic means for indicating the level of the fluid in the vessel.

2. In the combination claimed in claim 1, including:
(a) a charging tube means in the vessel for charging and discharging liquid therethrough, into and out of the vessel;
(b) said float assembly comprising an annular float tube assembly disposed about the charging tube means in spaced relation therewith;
(c) said counterweight comprising an annular counterweight disposed about the charging tube means;
(d) collar means pivotally connected to the charging tube means and having the float tube assembly and the counterweight connected on opposite sides thereof in balanced relationship to each other.

3. In the combination claimed in claim 1, wherein:
(a) said connecting means includes, a needle drive means at the end thereof within said casing for transmitting motion from said connecting means to said magnetic means;
(b) said magnetic means including a shaft rotatably mounted in the casing, a magnet fixedly connected to one end of the shaft and rotatable therewith and in juxtaposition with said register means, a disc fixedly connected to the other end of said shaft, and said disc having a pie-shaped opening therein into which said needle drive means extends to operatively engage said disc whereby on movement of said connecting means said magnetic means will rotate.

4. In the combination claimed in claim 1 wherein said connecting means includes a string drive means within said casing operatively associated with said magnetic means for transmitting movement from said connecting means to said magnetic means.

5. A specific gravity adjustment assembly for a liquid level gauge, comprising:
(a) an outer sleeve connected at one end to the liquid level gauge;
(b) an inner sleeve disposed longitudinally within said outer sleeve and fixedly connected thereto and concentric therewith and forming an annular space therebetween along the greater length thereof;
(c) a selector sleeve sealingly disposed about said inner sleeve in the annular space between the inner sleeve and the outer sleeve and concentric with said inner sleeve and adapted to be rotated within said space;
(d) resilient means fixedly connected at one end to the inner sleeve, between the inner sleeve and the selector sleeve, and having its other end extending into the liquid level gauge for engagement therewith, for force balancing said gauge in accordance with the specific gravity of the liquid being measured by said gauge; and
(e) said selector sleeve having force adjusting means in operative engagement with said resilient means for adjusting the force exerted by said resilient means to correspond to the specific gravity of the liquid being measured by the liquid level gauge.

6. In the combination claimed in claim 5 wherein:
(a) said force adjusting means comprising a biased edge traversing the axis of said selector sleeve at the end thereof adjacent to said gauge;
(b) said resilient means having the end thereof connected to the inner sleeve remote from the biased edge of said selector sleeve;
(c) said resilient means being adjustably engaged along its greater length with said selector sleeve and said inner sleeve so that on rotation of said selector sleeve the length of the portion of the resilient means so engaged will change;
(d) said resilient means having the end thereof extending into the liquid level gauge cantilevered from the point of engagement with the biased edge of the selector sleeve, whereby the force exerted by said resilient means will be selectively determined by the rotation of the selector sleeve to correspond to the specific gravity of the liquid being measured by the gauge.

References Cited by the Examiner

UNITED STATES PATENTS

| 1,544,340 | 6/1925 | Oleson | 73—322 |
| 1,594,536 | 8/1926 | Ludlow | 33—172 X |
| 2,311,387 | 2/1943 | Hastings | 73—317 |
| 2,497,694 | 2/1950 | Shakin | 73—322 |
| 2,576,561 | 11/1951 | Binford. | |

FOREIGN PATENTS 556,356   4/1957   Belgium.

LOUIS R. PRINCE, *Primary Examiner.*

DAVID SCHONBERG, *Examiner.*

DONN McGIEHAN, *Assistant Examiner.*